United States Patent [19]

Heck et al.

[11] 4,442,023
[45] Apr. 10, 1984

[54] HYDROTREATING HYDROCARBON FEEDSTOCKS

[75] Inventors: Roland H. Heck, Pennington; Edward J. Rosinski, Pedricktown; Stuart S. Shih, Cherry Hill, all of N.J.

[73] Assignee: Mobil Oil Corporation, New York, N.Y.

[21] Appl. No.: 467,573

[22] Filed: Feb. 17, 1983

Related U.S. Application Data

[63] Continuation of Ser. No. 220,554, Dec. 29, 1980, abandoned.

[51] Int. Cl.$^3$ .............................................. B01J 27/06
[52] U.S. Cl. .................................. 502/222; 502/226; 208/112; 208/216 R; 208/264
[58] Field of Search ...................... 252/439, 441, 442; 208/112, 216, 264

[56] References Cited

U.S. PATENT DOCUMENTS

| | | | |
|---|---|---|---|
| 3,223,618 | 12/1965 | Convery | 208/247 |
| 3,677,932 | 7/1972 | Hardesty et al. | 208/108 |
| 4,048,099 | 9/1977 | Hayes | 252/441 |
| 4,148,717 | 4/1979 | Young | 208/251 |
| 4,201,696 | 5/1980 | Legendre et al. | 252/442 |
| 4,202,758 | 5/1980 | O'Hara et al. | 208/264 |
| 4,267,033 | 5/1981 | Heck et al. | 208/264 |

OTHER PUBLICATIONS

Zielke et al., "Molten Salt Catalyst for Hydrocracking of Polynuclear Hydrocarbons", I & EC Process Design and Development, vol. 5, No. 2, (1966), pp. 151-157.

*Primary Examiner*—Jacqueline V. Howard
*Attorney, Agent, or Firm*—Alexander J. McKillop; Michael G. Gilman; Stanislaus Aksna

[57] ABSTRACT

An improved hydrotreating catalyst, and a process for using thereof, comprises a conventional Group VIA and Group VIIIA metal oxide or metal sulfide, deposited on an inorganic refractory support and about 0.1% by weight to about 7% by weight of the catalyst of a promoter comprising a halogenated metal selected from the Group consisting of halogenated metals of Group IB, IIB, IIIB, titanium and tin. The presence of the promoter results in greater degree of desulfurization and in CCR reduction of hydrocarbon feedstocks, especially highly aromatic petroleum residue and synthetically-derived hydrocarbons, e.g., coal liquids.

13 Claims, 2 Drawing Figures

HYDROTREATING HYDROCARBON FEEDSTOCKS

This is a continuation of copending application Ser. No. 220,554 filed Dec. 19, 1980 now abandoned.

BACKGROUND OF THE INVENTION

1. Field of the Invention

This invention relates to hydrotreating of hydrocarbon feedstocks and more particularly to the catalytic treatment of petroleum and coal derived feedstocks to effect removal of sulfur and to reduce Conradson Carbon Residue (CCR).

2. Description of the Prior Art

The use of hydrotreating (HDT) to upgrade residual hydrocarbon fractions for use as charge stocks for catalytic cracking was well known in the art by the 1960's. Hydrotreating, as used herein encompasses those processes using hydrogen in the presence of catalysts in order to remove undesirable compounds from hydrocarbons, i.e., to upgrade the hydrocarbons.

By 1960, it was recognized that hydrotreatment of residues could be used for demetalation, dusulfurization, CCR reduction and denitrogenation. There was universal recognition at that time in the art that hydrogenation catalysts comprising Group VIA (Cr, Mo, W) and Group VIIIA metals or their oxides or sulfides deposited on porous refractory supports were extremely useful in hydrotreating processes. Preferred catalysts for hydrotreating were considered to be cobalt-molybdate or nickel-cobalt-molybdate supported on alumina. These catalysts are generally referred to in the art as "conventional HOT catalysts".

The use of zinc halide catalysts for the hydrocracking of polynuclear aromatics, such as coal extract, has been studied by the Research Division, Consolidated Coal Company, Library, Pennsylvania. The studies are described by Zielke et al in the following series of articles appearing in INDUSTRIAL AND ENGINEERING CHEMISTRY, PROCESS DESIGN AND DEVELOPMENT: Molten Zinc Halide Catalysts for Hydrocracking Coal Extract and Coal, Vol. 5, No. 2, April 1966, pages 158-164, and Fluidized Combustion Process for Regeneration of Spent Zinc Chloride Catalysts, Vol. 8, No. 4, October 1969, pages 552-558. In addition, Zielke et al also disclose the use of nickel-molybdate catalyst impregnated with 19% zinc chloride for hydrocracking, see INDUSTRIAL AND ENGINEERING CHEMISTRY, Vol. 5, No. 2 April 1966, pages 151-157.

U.S. Pat. No. 3,223,618 discloses a process for producing a high quality catalytic cracking feed stock comprising contacting an asphalt base crude oil contaminated with coke formers, sulfur, nitrogen and metals with zinc chloride. U.S. Pat. No. 3,677,932 discloses the use of a molten salt mixture comprising zinc halide and a modifying molten salt in a process for conversion of heavy petroleum fractions containing heteroatomic contaminants. Demetallization of hydrocarbons using zinc chloride and/or titanium tetrachloride is taught in U.S. Pat. No. 4,148,717.

Whereas a great amount of attention has been given to hydrotreating petroleum residual fractions, much less emphasis has been placed specifically on highly aromatic petroleum and coal derived liquids. In comparison with less aromatic hydrocarbon liquids, the desulfurization of highly aromatic liquids with conventional HDT catalysts is more difficult and has been less successful. Thus, U.S. Pat. No. 3,812,028 discloses a process for hydrotreating fossil fuels containing polynuclear aromatics utilizing a catalyst comprising activated carbon and a metallic component. U.S. Pat. No. 4,051,021 discloses a hydrodesulfurization process using a catalyst comprising a Group VI and/or Group VIII metal having a specified pore size distribution. In the process, a hydrocarbon feed is contacted with a conventional HDT catalyst having greater than 50 percent of its total pore volume of absolute diameter ranging from about 70 Angstroms to about 100 Angstroms.

The refining of synthetic crudes derived from sources such as coal, shale oil, tar sands and the like received consideration in papers delivered at the New Orleans Meeting of the Division of Petroleum Chemistry of the American Chemical Society held on March 20-25, 1977. The papers were published in the Society's Preprints, Vol. 22, No. 3, August 1977.

In comparison with conventional petroleum feedstocks, synthetically-derived hydrocarbons (e.g., coal liquids) and petroleum residua generally exhibit slightly higher carbon content, but significantly lower hydrogen content. Recent data suggests both a higher degree of aromaticity and a more highly condensed ring structure for coal liquids than for conventional petroleum type liquids.

A more striking difference between the synthetic hydrocarbons and conventional petroleum type liquids is the heteroatom content. Nitrogen, oxyen and sulfur levels in synthetic hydrocarbons are generally much higher than in petroleum. Furthermore, 40-70 wt. % of the nitrogen in coal liquids is basic in character as compared to 25-30 wt. % for typical conventional petroleum stocks. For these and other reasons, upgrading of aromatics-rich synthetic and petroleum derived hydrocarbons has not been as successful as that of conventional feedstocks having lower aromatics content.

Accordingly, it is a primary object of this invention to provide an improved process for hydrotreating hydrocarbon feedstocks.

It is an additional object of this invention to provide an improved process for hydrotreating of highly aromatic hydrocarbon feedstock.

It is yet another object of this invention to provide an improved hydrotreating catalyst.

Additional objects of this invention will become apparent to those skilled in the art from the study of the specification and the claims.

SUMMARY OF THE INVENTION

In accordance with the present invention, there is provided a hydrotreating process for hydrocarbonaceous feedstocks, comprising contacting the feedstocks under hydrotreating conditions with a catalyst comprising a supported Group VIA metal and a Group VIIIA metal, impregnated with about 0.1 wt % to about 7 weight % of a metal halide promoter. The metal component of the metal halide promoter is selected from Group IB, IIB or IIIB of the Periodic Table of the Elements, titanium or tin. Hydrotreating in accordance with the present invention results in a substantial sulfur removal and CCR reduction of the feedstock.

DETAILED DESCRIPTION OF THE INVENTION

Figure 1:
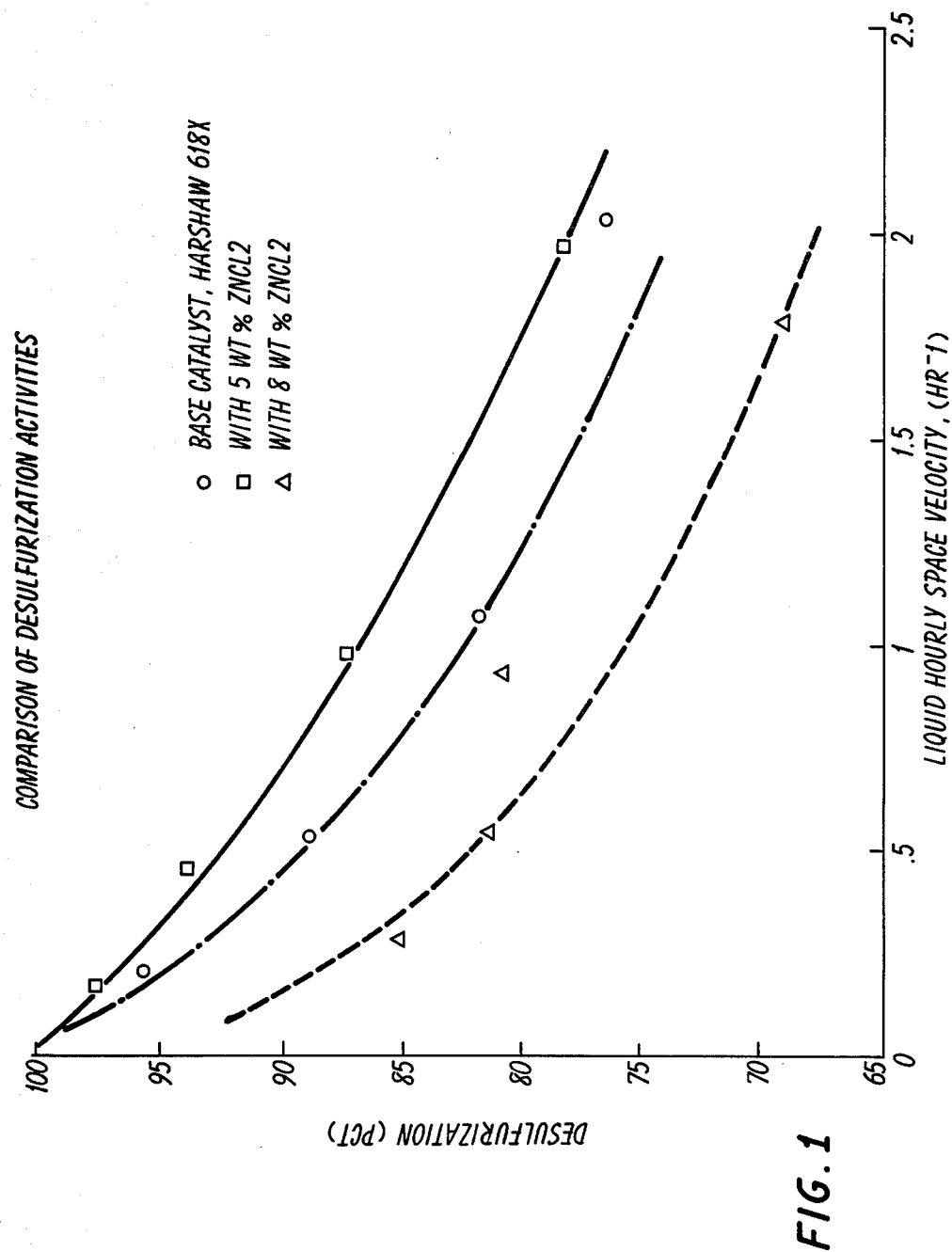
FIG. 1 is a graph of experimental data summarizing comparative experiments of the desulfurization activity of the catalyst of the present invention containing the promoter and a catalyst of prior art without the promoter.

A hydrocarbonaceous feedstock is contacted under hydrotreating conditions with the catalyst of the present invention to produce a product having reduced sulfur content and reduced Conradson Carbon Residue or CCR (a procedure for determining CCR of hydrocarbon feedstocks is set forth in ASTM Test D 1980-65).

Although the process of this invention is applicable to any hydrocarbonaceous sulfur-containing feedstocks, it is particularly useful for the desulfurization and CCR reduction of high sulfur containing coal liquids and aromatic petroleum fractions.

Particularly preferred feedstocks are polynuclear aromatic containing liquids derived from such sources as petroleum, coal, shale oil, tar sands. Suitable feedstocks for the present invention comprise refractory stocks, such as FCC cycle oil, FCC clarified slurry oil and also the products of coal liquefaction processes. Highly aromatic petroleum liquids are also suitable feedstocks for this invention. Heavy aromatic, high sulfur content crudes make up an increasing fraction of today's refinery feeds. This trend towards less desirable refinery feed is very likely to continue in the near future. Furthermore, refinery by-product liquids, such as FCC clarified slurry oil and FCC cycle oil, can be hydrotreated in accordance with this invention to produce significant amounts of gasoline and diesel fuel.

Products from the liquefaction of coal are generally highly aromatic and thus they are prime feedstocks for the novel hydrotreating process of the present invention. Coal is liquefied by exposing it to hydrogen gas or a hydrogen-bearing solvent under pressure and, in many processes, in the presence of a catalyst. Temperatures are generally kept below 480° C. (900° F.) so that the hydrocarbons are not converted to coke and gaseous products. Alternatively, coal can be destructively distilled by heating in such a way that its volatile components are given off and can then be condensed as a liquid. The net result is an increased hydrogen/carbon ratio in the liquid products. Hydrogen is generated by gasifying a portion of the coal, or of a coal residue in most processes, and this is a substantial portion of the cost of liquefaction.

The three direct general processes for converting coals to liquid fuels are: catalyzed hydrogenation, staged pyrolysis, and solvent refining. Each of these processes results in the production of a coal liquid which contains a variety of desirable and undesirable components. The desirable coal liquids are the oils (saturated and aromatic hydrocarbons) and the resins.

The undesirable components are the asphaltenes and the carbenes (high molecular weight highly aromatic solids) and the carboids (polymerized coke-like materials). The undesirable elements are the metals, sulfur, nitrogen, and oxygen which are generally present in higher concentration in the asphaltene and carboid fractions. Under hydrogenolysis conditions, the conversion of coal to oil has been suggested to proceed via the following sequence: Coal→Asphaltene→Oil. Therefore, asphaltene generation and elimination are of great importance in the liquefaction process.

One example of a typical coal liquefaction process is the Solvent Refined Coal (SRC) process, which is a method of dissolving coal to remove its ash, reduce its sulfur content and lower its average molecular weight. Pulverized coal is mixed with a solvent and hydrogen and heated until most of it dissolves. Gases including hydrogen sulfide are removed, as are ash and other undissolved solids. A fraction of the remaining liquid is recycled as the solvent, and the rest is product, a low-sulfur boiler fuel that is solid at room temperature but melts readily at about 375° F. It is the light organic liquid derived from the solvent Refined coal (SRC) process that is a suitable feedstock for this invention.

Another coal liquefaction process is the H-Coal process. In this process, coal is converted to oil by direct hydrogenation. The sequence of processing steps is essentially the same as in solvent refining except that the mixture of finely ground coal, recycle oil, and hydrogen is reacted in the presence of a catalyst. The process can produce either synthetic crude oil or, by lowering the reaction temperature and adding less hydrogen, a heavy-oil boiler fuel. The Synthoil process is similar to H-Coal in that it is also a catalytic process.

Still another coal liquefaction process is the Donor Solvent process. This process differs from H-Coal in that hydrogenation of the coal is carried out indirectly, through a solvent that transfers hydrogen to the coal while extracting a liquid product.

The products of all of the above coal liquefaction processes have relatively high aromatics content. Similarly, some petroleum-derived feedstocks, e.g., coker gas oil, FCC clarified slurry oil, FCC main column bottoms, also have relatively high concentration of aromatics.

The aromaticity of a particular feedstock can be expressed as "% $C_A$". The "% $C_A$" is defined as the percent of carbon atoms which are present in aromatic rings based on the total amount of carbon atoms and is given by the formula:

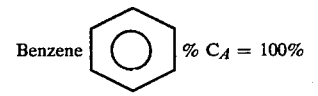

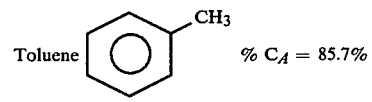

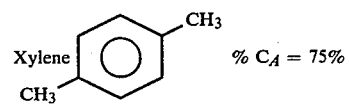

The % $C_A$ for representative compounds are as follows:

$$\% C_A = \frac{\text{C Atoms in Aromatic Rings}}{\text{Total C Atoms}} \times 100\%$$

The aromaticity of hydrocarbon feedstocks that are suitably used in the process of this invention, as expressed in % $C_A$, range from between about 30% and 100% and is preferably from about 40% to about 100%.

Aromaticity is a function of boiling point. This is clearly shown in Table 1 which gives properties, including % $C_A$, for various petroleum components.

TABLE 1

| Aromaticity of Petroleum Components | | | | | |
|---|---|---|---|---|---|
| | FCC Light Gasoline | FCC Light Cycle Oil | FCC Clarified Slurry Oil | Coker Light Gas Oil | Coker Heavy Gas Oil |
| Gravity (°API) | 47.9 | 17.4 | 0.3 | 33.1 | 21.6 |
| Hydrogen (wt. %) | 12.68 | 9.80 | 7.97 | 12.74 | 11.28 |
| Nitrogen (wt. %) | 0.031 | 0.25 | 0.41 | 0.30 | 0.76 |
| Aromaticity (% $C_A$) | 36 | 54 | 70 | 23 | 38 |
| Distillation (D-2887), °F. | | | | | |
| 5% | 79 | 398 | 576 | 346 | 469 |
| 50% | 274 | 523 | 727 | 459 | 597 |
| 95% | 404 | 677 | 863 | 543 | 686 |

Table 2 below gives aromaticities for various coal liquids and petroleum residua.

TABLE 2

AROMATICITIES OF COAL LIQUIDS AND PETROLEUM RESIDUAL DETERMINED BY C13 NMR SPECTROSCOPY

| | % $C_A$ (Atom %) | C/H (Atom Ratio) |
|---|---|---|
| SRC type I from Illinois No.6 Coal | 77 | 1.29 |
| SRC Recycle Solvent | 70 | 0.970 |
| Synthoil from Illinois No.6 Coal | 61 | 0.922 |
| H-Coal from Illinois No.6 Coal (fuel oil mode) | 63 | 0.940 |
| Petroleum No.6 Fuel Oil | 24 | 0.647 |
| Mid-Continent Vacuum Residuum | 19 | 0.600 |
| West Texas Sour Vacuum Residuum | 34 | 0.706 |

It can be seen from Table 2 that the % $C_A$ for coal derived liquids ranges from between about 50% and 80%, while the % $C_A$ for petroleum residua ranges from between about 20% to about 35%.

The aromatic feedstock of this invention must be further characterized by having a majority of its aromaticity in "polynuclear aromatics". Polynuclear aromatics are aromatic compounds having three or more connected aromatic rings, such as anthracene, phenathrene, chrysene, etc.

The hydrotreating catalyst used in the present invention comprises a hydrogenation component composited within a refractory support and impregnated with about 0.1 weight % to about 7 weight % (wt. %), preferably with about 0.2 to about 6.5 weight % and most preferably with about 0.5 to about 5 weight % of a metal halide promoter based on the total weight of the catalyst. It will be apparent to those skilled in the art that the amounts of the promoter set forth above designate approximate amounts, which may include levels of the promoter of up to about 5% deviation above and/or below the stated limits. Thus, e.g., the terms about 5% wt and about 7% wt., include the levels of the promoter of from about 4.75 wt % to about 5.25 wt % and of from about 6.65 wt % to about 7.35 wt %, respectively. The hydrogenation component comprises at least one Group VIA elemental metal, metal oxide, or metal sulfide and at least one Group VIIIA elemental metal, metal oxide, or metal sulfide. As used throughout the specification and claims herein, the word "Group" refers to the Periodic Chart of the Elements, Fisher Scientific Company, Cat. No. 5-702-10, 1978. Thus, Group VIA metals include Cr, Mo and W and non-limiting examples of Group VIIIA metals include Fe, Co and Ni. Preferred combinations of the metals comprising the hydrogenation component include nickel-molybdenum, cobalt-molybdenum, nickel-tungsten, cobalt-nickel-molydbdenum, and the most preferred combinations are nickel-molybdenum, cobalt-molybdenum.

The Group VIA metal, calculated as the metal oxide thereof, based on total supported hydrogenation component, is present in an amount of at least 8 wt. %, preferably from about 8 to about 25 wt. %, most preferably from about 10 to 20 wt. %. The Group VIIIA metal, calculated as the metal oxide thereof, based on total supported hydrogenation component is present in an amount of at least 2 wt. %, preferably from about 2 to 15 wt. %, and more preferably from about 3.5 to 6.5 wt. %. The support is an inorganic refractory oxide, such as alumina, silica-alumina, silica, magnesia or combinations thereof. The supported hydrogenation component may be prepared in a conventional manner, for example, by impregnating an alumina-containing support with salts of the desired hydrogenation metals. Methods for preparing alumina supports and of depositing the hydrogenation components (metals of Group VIA and Group VIIIA) thereon are well known in the art.

The metal halide promoter solution comprises a halogenated metal selected from metals of Groups IB, IIB and IIIB, titanium or tin, e.g., Cu, Ag, Au, Zn, Cd, Al, Ti and Sn, preferably Zn, Al, Sn, Ti and Cu, most preferably Zn. The halogen function of the promoter solution is selected from flourine, chlorine, bromine and iodine, preferably fluorine and chlorine, most preferably chlorine. Thus, suitable promoters are $ZnCl_2$, $SnCl_2$, $SnCl_4$, $TiCl_4$, $CuCl_2$, $AlCl_3$, $FeCl_3$, most preferably $ZnCl_2$.

The promoter solution is usually impregnated onto a commercial catalyst already containing the hydrogenation component, or, alternatively, the promoter and the hydrogenation metal component may be impregnated onto the catalyst support simultaneously. In either case, the impregnation is carried out in a conventional manner, e.g., by impregnating the catalyst with an acidfied solution of metal halide, or with solvent-dissolved metal halide, or by any other conventionally known impregnation techniques.

The amount of metal halide in the solution is such that the product (the catalyst impregnated with the metal halide promoter) contains not more than about 7% by weight of the promoter.

The hydrogen gas which is used during the process of this invention is circulated at a rate of between about 1,000 and 15,000 scf/bbl of feed and preferably between about 3,000 and 8,000 scf/bbl. The hydrogen purity may vary from about 60 to 100 percent. If the hydrogen is recycled, which is customary, it is desirable to provide means for bleeding-off a portion of the recycle gas and to add makeup hydrogen in order to maintain the hydrogen purity within the specified range. The recycled gas is usually washed with a chemical absorbent for hydrogen sulfide or otherwise treated in a known matter to reduce the hydrogen sulfide content thereof prior to recycling.

A hydrocarbon feedstock is contacted with the catalyst of this invention under hydroprocessing conditions comprising a hydrogen pressure of about 69 atmospheres (1000 psig) to about 205 atmospheres (3000 psig), preferably about 103 atmospheres (1500 psig) to about 171 atmospheres (2500 psig); a temperature of 345° C. (650° F.) to 455° C. (850° F.), preferably 370° C. (700° F.) to 440° C. (820° F.); and a liquid hourly space velocity of 0.1 to 3.0, preferably 0.4 to 1.5. To carry out the present invention, any catalytic bed can be used, e.g., fixed bed, ebullated bed, fluid catalyst bed.

The following examples illustrate the invention without limiting same.

EXAMPLE 1

A hydrotreating catalyst containing 5 wt. % zinc chloride was prepared by impregnating 183 g. Harshaw NiMo catalyst with an acified HCl (pH of about 2.3) solution of 9.15 g. $ZnCl_2$ in 91.5 g. water. Prior to the impregnation the water pore volume was determined by water saturating a known weight of dry catalyst and then calculating the pore volume of 0.5 as weight of water adsorbed per gram of catalyst. Before contacting the catalyst with the above solution, the sample was evacuated for one half hour. The solution was sprayed on the catalyst in a rolling container to allow uniform distribution of the impregnating solution. The impregnated catalyst was allowed to stand for 3 hours at room temperature prior to drying at 230° F. for 24 hours. The bulk of the sample was calcined for 4 hours at 800° F., while a sample for analysis was calcined for 10 hours at 1000° F. The catalyst compositions for the resultant catalyst at these two calcinations are as follows:

for 3 hours, then air dried for about 40 hours at 230° F. and finally calcined for 4 hours at 800° F.

EXAMPLES 3-14

In a fixed bed catalytic reactor, an FCC clarified slurry oil was contacted under hydrotreating conditions with zinc chloride promoted catalysts and a conventional hydrotreating catalyst. Hydrotreating conditions included a pressure of about 137 atmospheres (2000 psig), a temperature of between about 410° C. (770° F.) and 420° C. (785° F.), a liquid hourly space velocity (LHSV) of between about 0.1 and 2.5 and a hydrogen circulation rate of between about 13,300 scf/bbl and 4300 scf/bbl. The FCC clarified slurry oil feedstock had the following properties:

| Gravity, API | 1.3 |
| Hydrogen, wt. % | 7.92 |
| Sulfur, wt. % | 0.96 |
| Nitrogen, wt. % | 0.40 |
| CCR, wt. % | 8.68 |

Figure 2:
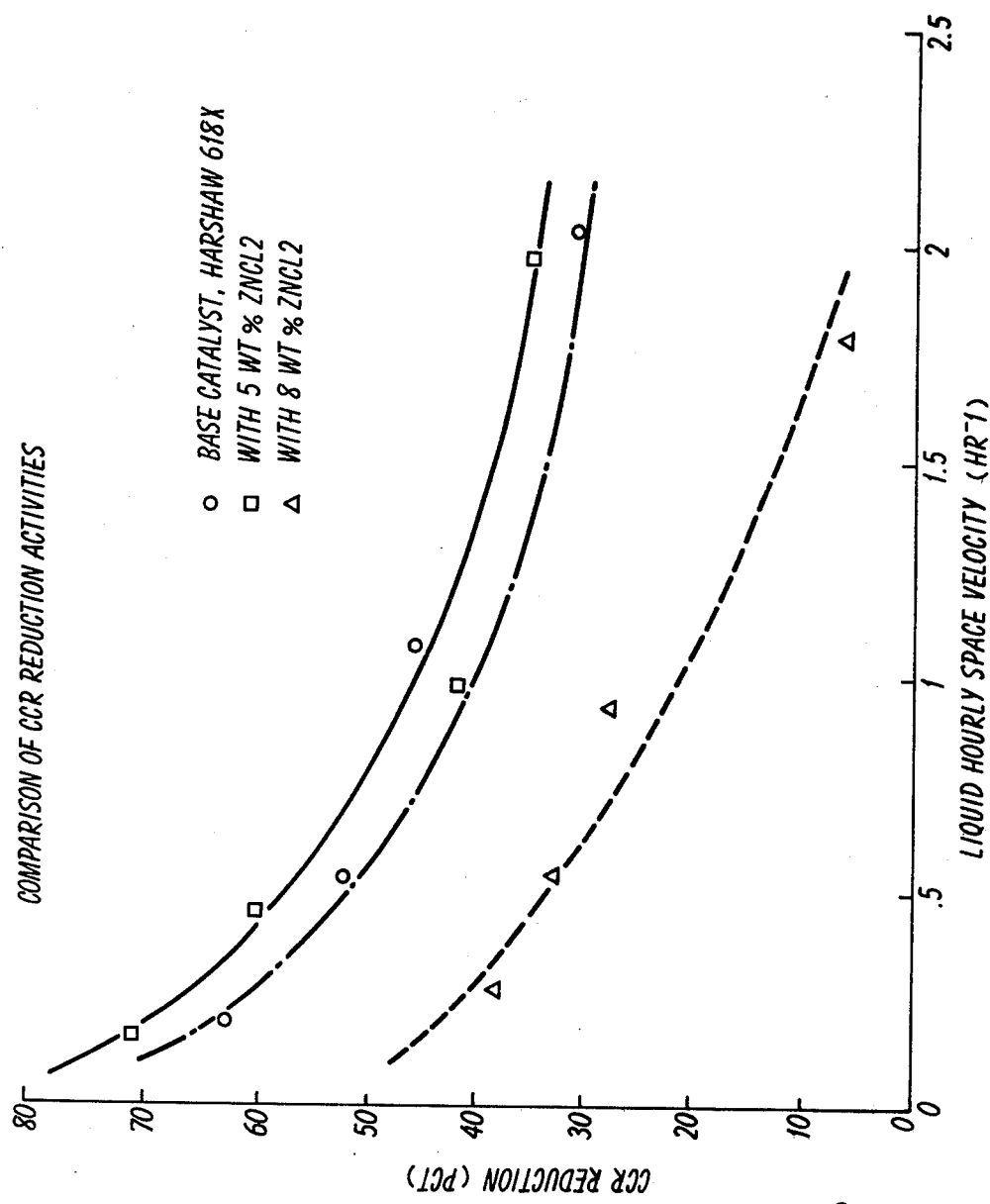
FIG. 2 is a graph of experimental data summarizing comparative experiments of the CCR reduction properties of the catalyst of the present invention containing the promoter and a catalyst of prior art without the promoter.

In Examples 3-6, the catalyst employed was zinc chloride promoted NiMo with 5 wt. % $ZnCl_2$; in Examples 7-10, the catalyst was zinc chloride promoted NiMo with 8 wt. % $ZnCl_2$. In Examples 11-14 the catalyst was a commercial NiMo hydrotreating catalyst produced by Harshaw (HARSHAW 618X). The data of Examples 3-14 is summarized in Table 3 and graphically represented in FIGS. 1 and 2.

TABLE 3

| EXAMPLE NO. | 3 | 4 | 5 | 6 | 7 | 8 | 9 | 10 | 11 | 12 | 13 | 14 |
|---|---|---|---|---|---|---|---|---|---|---|---|---|
| OPERATING CONDITIONS | | | | | | | | | | | | |
| Catalyst | NiMo with 5 Wt. Pct. $ZnCl_2$ | | | | NiMo with 8 Wt. Pct. $ZnCl_2$ | | | | Unpromoted NiMo (HARSHAW 618X) | | | |
| Pressure (PSIG) | 2000 | 2000 | 2000 | 2000 | 2000 | 2000 | 2000 | 2000 | 2000 | 2000 | 2000 | 2000 |
| Avg. Reactor Temp. (°F.) | 775 | 774 | 778 | 770 | 779 | 775 | 779 | 772 | 783 | 763 | 777 | 776 |
| LHSV VFF/HR/VCAT | 0.97 | 0.16 | 1.97 | 0.44 | 0.93 | 0.28 | 1.79 | 0.54 | 1.07 | 0.19 | 2.03 | 0.52 |
| $H_2$ CIRC., SCF/BBL | 5650 | 13230 | 5530 | 8832 | 6351 | 3868 | 2000 | 6132 | 5455 | 6605 | 4319 | 5253 |
| *TLP PROPERTIES | | | | | | | | | | | | |
| Gravity (API) | 6.5 | 13.0 | 4.8 | 9.0 | 6.0 | 9.9 | 3.5 | 6.6 | 8.5 | 13.6 | 5.6 | 9.1 |
| Hydrogen (Wt. Pct.) | 9.86 | 10.46 | 9.23 | 9.96 | 9.45 | 9.84 | 8.91 | 9.39 | 9.69 | 10.50 | 9.33 | 9.83 |
| Sulfur (Wt. Pct.) | 0.12 | 0.03 | 0.21 | 0.07 | 0.18 | 0.14 | 0.29 | 0.18 | 0.18 | 0.04 | 0.23 | 0.11 |
| Nitrogen (Wt. Pct.) | 0.21 | 0.08 | 0.30 | 0.19 | 0.24 | 0.21 | 0.29 | 0.23 | 0.18 | 0.06 | 0.30 | 0.18 |
| CCR (Wt. Pct.) | 5.34 | 3.28 | 5.69 | 4.31 | 6.33 | 5.40 | 8.13 | 5.90 | 4.81 | 3.12 | 6.02 | 4.24 |
| HETEROATOM REMOVAL | | | | | | | | | | | | |
| Desulfurization (Pct. Wt.) | 87.6 | 97.6 | 78.2 | 94.0 | 80.9 | 85.2 | 69.8 | 81.5 | 81.8 | 95.7 | 76.4 | 89.0 |
| Denitrogenation (Pct. Wt.) | 47.9 | 84.6 | 25.6 | 62.4 | 40.6 | 48.0 | 27.7 | 43.2 | 55.4 | 85.9 | 25.3 | 55.9 |
| CCR Removal (Pct. Wt.) | 42.1 | 70.8 | 34.9 | 60.7 | 27.8 | 38.4 | 6.6 | 32.9 | 46.0 | 63.2 | 30.9 | 52.2 |

*Total liquid product ($C_5+$) properties

| Calcination: | |
|---|---|
| 10 hours at 1000° F. | 4 hours at 800° F. |
| $MoO_3$ (wt. %) 15.3 | |
| Zn (wt. %) 2.2 | |
| Cl (wt. %) 0.10 | 0.63 |
| Ni (wt. %) 2.7 | |
| Ash (wt. %) 98.8 | 88 |

EXAMPLE 2

A hydrotreating catalyst containing 8 wt. % zinc chloride was prepared by impregnating 66 g. of the catalyst prepared according to Example 1 with additional aqueous solution of zinc chloride containing 5.28 g. of $ZnCl_2$ dissolved in 33 g $H_2O$ with 2 drops of concentrated HCl to make a clear solution. The impregnated sample was allowed to stand at room temperature As shown in Table 3 and FIGS. 1 and 2, the catalyst impregnated with 5% wt. $ZnCl_2$ promoter is more effective in desulfurization and CCR reduction than either the conventional hydrogenation catalyst (HARSHAW 618X), or the conventional catalyst impregnated with 8% wt. of the promoter.

It will be apparent to those skilled in the art that the above examples can be successfully repeated with ingredients equivalent to those generally or specifically set forth above and/or other variable process conditions.

From the foregoing description one skilled in the art can readily ascertain the essential features of this invention and without departing from the spirit and scope thereof can adapt it to various applications.

What is claimed is:

1. In a hydrotreating catalyst consisting essentially of about 10 wt. % to about 20 wt. % of at least one Group VIA metal, metal oxide or metal sulfide and about 3.5 wt. % to about 6.5 wt. % of at least one Group VIIIA metal, metal oxide or metal sulfide deposited on an inorganic refractory oxide, the improvement wherein said catalyst further consists essentially of about 0.1% to about 7% by weight of a halogenated metal compound selected from the group consisting of halogenated metal compound of Groups IB, IIB, IIIB, titanium and tin.

2. A catalyst according to claim 1 wherein the halogen function of said halogenated metal compound is selected from the group consisting of fluorine and chlorine.

3. A catalyst according to claim 2 wherein said halogenated metal compound is a chlorinated metal compoud.

4. A catalyst according to claim 3 wherein said chlorinated metal compound is selected from the group consisting of $ZnCl_2$, $FeCl_3$, $SnCl_2$, $SnCl_4$, $TiCl_4$, $CuCl_2$ and $AlCl_3$.

5. A catalyst according to claim 4 wherein said chlorinated metal compound is present on said catalyst in an amount of about 0.5 wt % to about 5 wt. %.

6. A catalyst according to claim 5 wherein said at least one Group VIA metal is molybdenum and said at least one Group VIIIA metal is nickel.

7. A catalyst according to claim 5 wherein said at least one Group VIA metal is molybdenum and said at least one Group VIIIA metal is cobalt.

8. A catalyst according to claim 6 wherein said chlorinated metal compound is $ZnCl_2$.

9. A catalyst according to claim 7 wherein said chlorinated metal compound is $ZnCl_2$.

10. A catalyst according to claim 8 wherein said $ZnCl_2$ is present on said catalyst in the amount of 5 wt %.

11. A catalyst according to claim 9 wherein said $ZnCl_2$ is present on said catalyst in the amount of 5 wt %.

12. A catalyst according to claim 10 wherein the catalyst is supported on an inorganic refractory support selected from the group consisting of alumina, silica-alumina, silica, magnesia and combinations thereof.

13. A catalyst according to claim 11 wherein the catalyst is supported on an inorganic refractory support selected from the group consisting of alumina, silica-alumina, silica, magnesia and combinations thereof.

* * * * *

UNITED STATES PATENT AND TRADEMARK OFFICE
CERTIFICATE OF CORRECTION

PATENT NO. : 4,442,023          Page 1 of 2
DATED : April 10, 1984
INVENTOR(S) : Roland H. Heck et al.

It is certified that error appears in the above-identified patent and that said Letters Patent is hereby corrected as shown below:

| | |
|---|---|
| Column 1, Title: | Before the word "HYDROTREATING" insert --CATALYST FOR--. |
| Column 1, Line 6: | "December 19, 1980" should be --December 29, 1980--. |
| Column 1, Line 24: | "dusulfurization" should be --desulfurization--. |
| Column 1, Line 34: | "HOT" should be --HDT--. |
| Column 2, Line 30: | "oxyen" should be --oxygen--. |
| Column 3, Line 17: | "1980-65" should be --1890-65--. |
| Column 4, Line 15: | "solvent" and "coal" should each be initial capitalized. |
| Column 4, Lines 45-64: | after the word "formula:" insert |

$$--\%C_A = \frac{\text{C Atoms in Aromatic Rings}}{\text{Total C Atoms}} \times 100\%$$

The % $C_A$ for representative compounds are as follows:--

(The benzene rings should be listed after the above.)

UNITED STATES PATENT AND TRADEMARK OFFICE
CERTIFICATE OF CORRECTION

PATENT NO. : 4,442,023          Page 2 of 2

DATED : April 10, 1984

INVENTOR(S) : Roland H. Heck et al.

It is certified that error appears in the above-identified patent and that said Letters Patent is hereby corrected as shown below:

Column 5, Line 23:     Delete "RESIDUAL" and insert --RESIDUA--.

Column 6, Line 7:     "molydbdenum" should be --molybdenum--.

Column 6, Line 34:     "flourine" should be --fluorine--.

Column 6, Line 45:     "acidfied" should be --acidified--.

Signed and Sealed this

Thirteenth Day of November 1984

[SEAL]

Attest:

GERALD J. MOSSINGHOFF

*Attesting Officer*     *Commissioner of Patents and Trademarks*